(12) United States Patent
Katar et al.

(10) Patent No.: US 8,989,379 B2
(45) Date of Patent: Mar. 24, 2015

(54) NETWORK ENCRYPTION KEY ROTATION

(75) Inventors: Srinivas Katar, Gainesville, FL (US); Lawrence W. Yonge, Ocala, FL (US); Manjunath Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 918 days.

(21) Appl. No.: 11/971,446

(22) Filed: Jan. 9, 2008

(65) Prior Publication Data

US 2008/0298590 A1 Dec. 4, 2008

Related U.S. Application Data

(60) Provisional application No. 60/941,949, filed on Jun. 4, 2007.

(51) Int. Cl.
| | |
|---|---|
| *H04L 9/00* | (2006.01) |
| *H04L 12/915* | (2013.01) |
| *H04L 12/28* | (2006.01) |
| *H04L 12/721* | (2013.01) |
| *H04L 12/727* | (2013.01) |
| *H04L 12/733* | (2013.01) |
| *H04L 12/729* | (2013.01) |

(Continued)

(52) U.S. Cl.
CPC .......... *H04L 47/787* (2013.01); *H04L 12/2801* (2013.01); *H04L 45/12* (2013.01); *H04L 45/121* (2013.01); *H04L 45/122* (2013.01); *H04L 45/125* (2013.01); *H04L 45/16* (2013.01); *H04L 45/123* (2013.01); *H04L 12/413* (2013.01); *H04B 2203/5445* (2013.01); *H04L 12/2856* (2013.01); *H04L 12/44* (2013.01)
USPC ............ 380/262; 380/43; 380/274; 380/277; 380/278

(58) Field of Classification Search
CPC ............... H04L 9/12; H04L 9/18; H04L 9/08; G07C 9/00182
USPC ........ 380/43, 46–47, 255, 262, 277–278, 274
See application file for complete search history.

(56) References Cited

U.S. PATENT DOCUMENTS

| | | |
|---|---|---|
| 4,578,530 A | 3/1986 | Zeidler |
| 4,689,786 A | 8/1987 | Sidhu et al. |

(Continued)

FOREIGN PATENT DOCUMENTS

| | | |
|---|---|---|
| EP | 1748574 | 1/2007 |
| EP | 1748597 A1 | 1/2007 |

(Continued)

OTHER PUBLICATIONS

Co-pending U.S. Appl. No. 13/113,474, filed May 23, 2011, 32 pages.

(Continued)

*Primary Examiner* — Saleh Najjar
*Assistant Examiner* — Peiliang Pan
(74) *Attorney, Agent, or Firm* — DeLizio Gilliam, PLLC

(57) ABSTRACT

Systems and methods for authenticating key rotation communications. Key rotation communications can include a key counter known to both a headend device and a station. Comparison between a local key counter and the key counter included in the key rotation communication can be used to authenticate the key rotation communication.

20 Claims, 8 Drawing Sheets

(51) Int. Cl.
*H04L 12/761* (2013.01)
*H04L 12/413* (2006.01)
*H04L 12/44* (2006.01)

(56) References Cited

U.S. PATENT DOCUMENTS

| | | | |
|---|---|---|---|
| 4,807,248 A | 2/1989 | Pyatt et al. | |
| 5,328,530 A | 7/1994 | Semiatin et al. | |
| 5,359,625 A | 10/1994 | Vander Mey et al. | |
| 5,491,750 A | 2/1996 | Bellare et al. | |
| 5,570,355 A | 10/1996 | Dail et al. | |
| 5,613,012 A | 3/1997 | Hoffman et al. | |
| 5,617,421 A | 4/1997 | Chin et al. | |
| 5,682,428 A | 10/1997 | Johnson | |
| 5,732,076 A | 3/1998 | Ketseoglou et al. | |
| 6,074,086 A | 6/2000 | Yonge, III | |
| 6,111,919 A | 8/2000 | Yonge, III | |
| 6,141,355 A | 10/2000 | Palmer et al. | |
| 6,167,137 A * | 12/2000 | Marino et al. | 380/255 |
| 6,173,400 B1 | 1/2001 | Perlman et al. | |
| 6,185,185 B1 | 2/2001 | Bass et al. | |
| 6,188,690 B1 | 2/2001 | Holden et al. | |
| 6,189,040 B1 | 2/2001 | Oohara | |
| 6,201,794 B1 | 3/2001 | Stewart et al. | |
| 6,243,761 B1 | 6/2001 | Mogul et al. | |
| 6,269,132 B1 | 7/2001 | Yonge, III | |
| 6,269,163 B1 | 7/2001 | Rivest et al. | |
| 6,272,135 B1 | 8/2001 | Nakatsugawa | |
| 6,278,685 B1 | 8/2001 | Yonge, III | |
| 6,307,940 B1 * | 10/2001 | Yamamoto et al. | 380/277 |
| 6,310,892 B1 | 10/2001 | Olkin | |
| 6,388,995 B1 | 5/2002 | Gai et al. | |
| 6,519,231 B1 | 2/2003 | Ding et al. | |
| 6,574,195 B2 | 6/2003 | Roberts | |
| 6,591,364 B1 | 7/2003 | Patel | |
| 6,606,303 B1 | 8/2003 | Hassel et al. | |
| 6,631,136 B1 | 10/2003 | Chowdhury et al. | |
| 6,711,163 B1 | 3/2004 | Reid et al. | |
| 6,775,656 B1 * | 8/2004 | Gettwart et al. | 705/401 |
| 6,804,252 B1 | 10/2004 | Johnson | |
| 6,904,462 B1 | 6/2005 | Sinha | |
| 6,910,136 B1 | 6/2005 | Wasserman et al. | |
| 7,039,021 B1 | 5/2006 | Kokudo | |
| 7,065,643 B1 | 6/2006 | Cornils et al. | |
| 7,085,284 B1 | 8/2006 | Negus | |
| 7,089,298 B2 | 8/2006 | Nyman et al. | |
| 7,181,620 B1 | 2/2007 | Hur | |
| 7,234,058 B1 | 6/2007 | Baugher et al. | |
| 7,346,021 B2 | 3/2008 | Yoshizawa et al. | |
| 7,350,076 B1 | 3/2008 | Young et al. | |
| 7,352,770 B1 | 4/2008 | Yonge, III | |
| 7,369,579 B2 | 5/2008 | Logvinov et al. | |
| 7,395,097 B2 | 7/2008 | Perdomo et al. | |
| 7,409,543 B1 | 8/2008 | Bjorn | |
| 7,496,039 B2 | 2/2009 | Yamada et al. | |
| 7,506,042 B2 | 3/2009 | Ayyagari | |
| 7,558,294 B2 | 7/2009 | Yonge, III | |
| 7,558,575 B2 | 7/2009 | Losh et al. | |
| 7,573,891 B1 | 8/2009 | Chow et al. | |
| 7,609,681 B2 | 10/2009 | Kurobe et al. | |
| 7,623,542 B2 | 11/2009 | Yonge, III et al. | |
| 7,684,333 B1 | 3/2010 | Dasylva et al. | |
| 7,756,039 B2 | 7/2010 | Yonge, III | |
| 7,797,751 B1 * | 9/2010 | Hughes et al. | 726/26 |
| 7,804,842 B2 | 9/2010 | Malik et al. | |
| 7,826,475 B2 | 11/2010 | Lee et al. | |
| 7,826,618 B2 * | 11/2010 | Klingler et al. | 380/274 |
| 7,894,487 B2 | 2/2011 | Yonge, III | |
| 7,949,356 B2 | 5/2011 | Yonge, III | |
| 7,961,694 B1 | 6/2011 | Chan et al. | |
| 8,112,358 B2 | 2/2012 | Yonge, III | |
| 8,170,051 B2 | 5/2012 | Yonge, III | |
| 8,429,406 B2 | 4/2013 | Yonge, III et al. | |
| 8,467,369 B2 | 6/2013 | Yonge, III et al. | |
| 8,488,615 B2 | 7/2013 | Yonge, III et al. | |
| 8,503,480 B2 | 8/2013 | Yonge, III et al. | |
| 8,510,470 B2 | 8/2013 | Yonge, III et al. | |
| 2001/0000709 A1 | 5/2001 | Takahashi et al. | |
| 2002/0015496 A1 | 2/2002 | Weaver et al. | |
| 2002/0025810 A1 | 2/2002 | Takayama et al. | |
| 2002/0029260 A1 | 3/2002 | Dobbins et al. | |
| 2002/0060986 A1 | 5/2002 | Fukushima et al. | |
| 2002/0097679 A1 | 7/2002 | Berenbaum | |
| 2002/0107023 A1 | 8/2002 | Chari et al. | |
| 2002/0114303 A1 | 8/2002 | Crosbie et al. | |
| 2002/0122411 A1 | 9/2002 | Zimmerman et al. | |
| 2002/0124177 A1 | 9/2002 | Harper et al. | |
| 2002/0133622 A1 | 9/2002 | Pinto | |
| 2002/0137462 A1 | 9/2002 | Rankin | |
| 2002/0141417 A1 | 10/2002 | Umayabashi | |
| 2003/0012166 A1 | 1/2003 | Benveniste | |
| 2003/0018812 A1 | 1/2003 | Lakshminarayana et al. | |
| 2003/0048183 A1 | 3/2003 | Vollmer et al. | |
| 2003/0067892 A1 | 4/2003 | Beyer et al. | |
| 2003/0086437 A1 | 5/2003 | Benveniste | |
| 2003/0095551 A1 | 5/2003 | Gotoh et al. | |
| 2003/0137993 A1 | 7/2003 | Odman | |
| 2003/0193959 A1 | 10/2003 | Lui et al. | |
| 2003/0224784 A1 * | 12/2003 | Hunt et al. | 455/426.2 |
| 2003/0228846 A1 | 12/2003 | Berliner et al. | |
| 2003/0229783 A1 | 12/2003 | Hardt | |
| 2004/0047319 A1 | 3/2004 | Elg | |
| 2004/0070912 A1 | 4/2004 | Kopp | |
| 2004/0081089 A1 | 4/2004 | Ayyagari et al. | |
| 2004/0090982 A1 | 5/2004 | Xu | |
| 2004/0128310 A1 | 7/2004 | Zmudzinski et al. | |
| 2004/0165532 A1 | 8/2004 | Poor et al. | |
| 2004/0174829 A1 | 9/2004 | Ayyagari | |
| 2004/0190542 A1 | 9/2004 | Ono et al. | |
| 2004/0210630 A1 * | 10/2004 | Simonnet et al. | 709/203 |
| 2004/0218577 A1 | 11/2004 | Nguyen et al. | |
| 2004/0234073 A1 | 11/2004 | Sato et al. | |
| 2004/0264428 A1 | 12/2004 | Choi et al. | |
| 2005/0001694 A1 | 1/2005 | Berkman | |
| 2005/0021539 A1 | 1/2005 | Short et al. | |
| 2005/0025176 A1 | 2/2005 | Ko et al. | |
| 2005/0068227 A1 | 3/2005 | Caspi et al. | |
| 2005/0071631 A1 | 3/2005 | Langer | |
| 2005/0089005 A1 | 4/2005 | Sakoda et al. | |
| 2005/0114489 A1 | 5/2005 | Yonge, III | |
| 2005/0117515 A1 | 6/2005 | Miyake | |
| 2005/0117750 A1 | 6/2005 | Rekimoto | |
| 2005/0135291 A1 | 6/2005 | Ketchum et al. | |
| 2005/0147075 A1 | 7/2005 | Terry | |
| 2005/0169222 A1 | 8/2005 | Ayyagari et al. | |
| 2005/0190785 A1 | 9/2005 | Yonge, III et al. | |
| 2005/0210157 A1 | 9/2005 | Sakoda | |
| 2005/0243765 A1 | 11/2005 | Schrader et al. | |
| 2005/0249186 A1 | 11/2005 | Kelsey et al. | |
| 2006/0002406 A1 | 1/2006 | Ishihara et al. | |
| 2006/0039371 A1 | 2/2006 | Castro et al. | |
| 2006/0072517 A1 | 4/2006 | Barrow et al. | |
| 2006/0077997 A1 | 4/2006 | Yamaguchi et al. | |
| 2006/0104301 A1 | 5/2006 | Beyer et al. | |
| 2006/0159260 A1 * | 7/2006 | Pereira et al. | 380/44 |
| 2006/0168647 A1 | 7/2006 | Chiloyan | |
| 2006/0224813 A1 | 10/2006 | Rooholamini et al. | |
| 2006/0251017 A1 | 11/2006 | Bishop | |
| 2006/0251021 A1 | 11/2006 | Nakano et al. | |
| 2006/0252378 A1 | 11/2006 | Bishop | |
| 2006/0256741 A1 | 11/2006 | Nozaki | |
| 2006/0268746 A1 | 11/2006 | Wijting et al. | |
| 2007/0004404 A1 | 1/2007 | Buckley et al. | |
| 2007/0019609 A1 | 1/2007 | Anjum | |
| 2007/0025244 A1 | 2/2007 | Ayyagari et al. | |
| 2007/0025384 A1 | 2/2007 | Ayyagari et al. | |
| 2007/0025391 A1 | 2/2007 | Yonge, III et al. | |
| 2007/0026794 A1 | 2/2007 | Ayyagari et al. | |
| 2007/0030811 A1 | 2/2007 | Frei et al. | |
| 2007/0053520 A1 | 3/2007 | Eckleder | |
| 2007/0058661 A1 | 3/2007 | Chow | |
| 2007/0058732 A1 | 3/2007 | Riedel et al. | |
| 2007/0060141 A1 | 3/2007 | Kangude et al. | |
| 2007/0097867 A1 | 5/2007 | Kneckt et al. | |

(56) References Cited

U.S. PATENT DOCUMENTS

| | | | |
|---|---|---|---|
| 2007/0115973 | A1 | 5/2007 | Koga et al. |
| 2007/0118730 | A1 | 5/2007 | Platt |
| 2007/0133388 | A1 | 6/2007 | Lee et al. |
| 2007/0133449 | A1 | 6/2007 | Schacht et al. |
| 2007/0140185 | A1 | 6/2007 | Garg et al. |
| 2007/0147322 | A1 | 6/2007 | Agrawal et al. |
| 2007/0189189 | A1 | 8/2007 | Andrews et al. |
| 2007/0220570 | A1 | 9/2007 | Dawson et al. |
| 2007/0254596 | A1 | 11/2007 | Corson et al. |
| 2007/0271398 | A1 | 11/2007 | Manchester et al. |
| 2007/0286074 | A1 | 12/2007 | Xu |
| 2007/0286111 | A1 | 12/2007 | Corson et al. |
| 2008/0002599 | A1 | 1/2008 | Yau et al. |
| 2008/0151820 | A1 | 6/2008 | Solis et al. |
| 2008/0178003 | A1 | 7/2008 | Eastham et al. |
| 2008/0181219 | A1 | 7/2008 | Chen et al. |
| 2008/0186230 | A1 | 8/2008 | Wengler et al. |
| 2008/0192666 | A1 | 8/2008 | Koskan et al. |
| 2008/0212591 | A1 | 9/2008 | Wu et al. |
| 2008/0222447 | A1 | 9/2008 | Ram et al. |
| 2008/0247408 | A1 | 10/2008 | Yoon et al. |
| 2008/0267106 | A1 | 10/2008 | Buddhikot et al. |
| 2008/0279126 | A1 | 11/2008 | Katar et al. |
| 2008/0298252 | A1 | 12/2008 | Yonge, III |
| 2008/0298589 | A1 | 12/2008 | Katar et al. |
| 2008/0298594 | A1 | 12/2008 | Yonge, III |
| 2008/0301052 | A1 | 12/2008 | Yonge, III |
| 2008/0301446 | A1 | 12/2008 | Yonge, III |
| 2008/0310414 | A1 | 12/2008 | Yonge, III |
| 2009/0010276 | A1 | 1/2009 | Yonge, III |
| 2009/0034552 | A1 | 2/2009 | Yonge, III |
| 2009/0040930 | A1 | 2/2009 | Yonge, III |
| 2009/0067389 | A1 | 3/2009 | Lee et al. |
| 2009/0074007 | A1 | 3/2009 | Yonge, III |
| 2009/0092075 | A1 | 4/2009 | Corson et al. |
| 2009/0106551 | A1 | 4/2009 | Boren et al. |
| 2009/0116461 | A1 | 5/2009 | Yonge, III |
| 2009/0119190 | A1 | 5/2009 | Realini |
| 2009/0154487 | A1 | 6/2009 | Ryan et al. |
| 2009/0207769 | A1 | 8/2009 | Park et al. |
| 2009/0311963 | A1 | 12/2009 | Haverty |
| 2010/0014444 | A1 | 1/2010 | Ghanadan et al. |
| 2010/0091760 | A1 | 4/2010 | Yoon |
| 2010/0100724 | A1 | 4/2010 | Kaliski, Jr. |
| 2010/0161972 | A1 | 6/2010 | Staring et al. |
| 2012/0072715 | A1 | 3/2012 | Yonge, III |
| 2013/0235730 | A1 | 9/2013 | Yonge, III et al. |
| 2013/0272315 | A1 | 10/2013 | Yonge, III et al. |
| 2013/0287041 | A1 | 10/2013 | Yonge, III et al. |

FOREIGN PATENT DOCUMENTS

| | | |
|---|---|---|
| EP | 1179919 | 7/2010 |
| JP | 3107317 A | 5/1991 |
| JP | 2002135177 A | 5/2002 |
| JP | 2005073240 A | 3/2005 |
| WO | WO9634329 A1 | 10/1996 |
| WO | WO9857439 A1 | 12/1998 |
| WO | WO02103943 A1 | 12/2002 |
| WO | WO03100996 A2 | 12/2003 |
| WO | WO2004038980 A2 | 5/2004 |

OTHER PUBLICATIONS

"U.S. Appl. No. 11/970,271 Final Office Action", Jul. 19, 2011, 21 pages.
"U.S. Appl. No. 11/970,271 Office Action", Mar. 9, 2012, 19 pages.
"U.S. Appl. No. 11/970,271 Office Action", Oct. 7, 2011, 20 pages.
"U.S. Appl. No. 11/970,271 Office Action", Dec. 7, 2010, 21 pages.
"U.S. Appl. No. 11/970,297 Final Office Action", Apr. 16, 2012, 32 pages.
"U.S. Appl. No. 11/970,297 Office Action", Mar. 30, 2011, 30 pages.
"U.S. Appl. No. 11/970,297 Office Action", Sep. 29, 2011, 31 pages.
"U.S. Appl. No. 11/970,323 Office Action", Dec. 7, 2010, 12 pages.
"U.S. Appl. No. 11/970,339 Final Office Action", Jul. 7, 2011, 14 pages.
"U.S. Appl. No. 11/970,339 Office Action", Jan. 19, 2011, 22 pages.
"U.S. Appl. No. 12/108,334 Final Office Action", Jun. 14, 2011, 28 pages.
"U.S. Appl. No. 12/108,334 Office Action", Feb. 16, 2011, 26 pages.
"U.S. Appl. No. 12/108,334 Office Action", Aug. 3, 2010, 20 pages.
"U.S. Appl. No. 12/133,270 Final Office Action", Nov. 18, 2011, 23 pages.
"U.S. Appl. No. 12/133,270 Office Action", Jun. 3, 2011, 67 pages.
"U.S. Appl. No. 12/133,301 Office Action", Mar. 1, 2012, 38 pages.
"U.S. Appl. No. 12/133,312 Final Office Action", Feb. 16, 2011, 24 pages.
"U.S. Appl. No. 12/133,312 Office Action", Jun. 8, 2011, 24 pages.
"U.S. Appl. No. 12/133,312 Office Action", Jul. 28, 2010, 29 pages.
"U.S. Appl. No. 12/133,315 Final Office Action", Jun. 9, 2011, 38 pages.
"U.S. Appl. No. 12/133,315 Final Office Action", Jul. 20, 2010, 30 pages.
"U.S. Appl. No. 12/133,315 Office Action", Dec. 24, 2009, 28 pages.
"U.S. Appl. No. 12/133,315 Office Action", Dec. 28, 2010, 36 pages.
"U.S. Appl. No. 12/133,325 Final Office Action", Dec. 9, 2010, 33 pages.
"U.S. Appl. No. 12/133,325 Office Action", May 27, 2010, 31 pages.
"U.S. Appl. No. 11/970,339 Office Action", Jun. 18, 2012, 26 pages.
"U.S. Appl. No. 12/108,334 Office Action", Aug. 3, 2012, 18 pages.
"U.S. Appl. No. 12/133,315 Office Action", Aug. 9, 2012, 37 pages.
"U.S. Appl. No. 12/133,301 Office Action", Sep. 22, 2010, 42 pages.
"U.S. Appl. No. 12/133,301 Final Office Action", Mar. 22, 2011, 39 pages.
Notification of First Office Action, The State Intellectual Property Office of the People's Republic of China, issued in Chinese Application No. 200880100486.9, Nov. 21, 2012, 11 pages.
"U.S. Appl. No. 13/303,913 Office Action, Dec. 26, 2012, 37 pages."
"U.S. Appl. No. 11/970,339 Final Office Action", Dec. 11, 2012, 25 pages.
"U.S. Appl. No. 12/133,301 Office Action", Sep. 25, 2013, 44 pages.
U.S. Appl. No. 12/133,301 Final Office Action, Sep. 26, 2012, 54 pages.
Muir, Andrew et al., "An Efficient Packet Sensing MAC Protocol for Wireless Networks", 20 Pages.
Co-pending U.S. Appl. No. 13/873,168, filed Apr. 29, 2013, 20 pages.
Co-pending U.S. Appl. No. 13/917,394, filed Jun. 13, 2013, 34 pages.
Co-pending U.S. Appl. No. 13/933,924, filed Jul. 2, 2013, 36 pages.
"U.S. Appl. No. 11/970,339 Office Action", Jun. 27, 2013, 22 pages.
"U.S. Appl. No. 13/113,474 Office Action", Jun. 17, 2013, 10 pages.
Afkhamie et al., "An Overview of the upcoming HomePlug AV Standard", May 2005, IEEE 0-7803-8844-5/05, pp. 400-404.
European Search Report—EP09178487, Search Authority, Munich Patent Office, Jan. 21, 2010.
Faure, Jean-Philippe et al., Call for Submissions. Draft Standard for Broadband over Power Line Networks: Medium Access Control and Physical Layer Specifications. Feb. 14, 2007, 4 pages.
Faure, Jean-Philippe et al., Coexistence/interoperability Cluster, FTR SG Requirements. Draft Standard for Broadband over Power Line Networks: Medium Access Control and Physical Layer Specifications. Feb. 5, 2007, 13 pages.
HomePlug Powerline Alliance Inc., "HomePlug AV White Paper," Doc. Ver. No. HPAVWP-050818, Aug. 2005, pp. 1-11.
International Search Report and Written Opinion—PCT/US2008/065811, International Searching Authority, European Patent Office, Nov. 25, 2008.
International Search Report and Written Opinion—PCT/US2008/065831, International Searching Authority, European Patent Office, Feb. 20, 2009, 22 pages.
Katar et al., "Beacon Schedule Persistence to Mitigate Beacon Loss in HomePlug AV Networks," May 2006, IEEE 1-4244-0113-05/06, pp. 184-188.
Lee et al., "HomePlug 1.0 Powerline Communication LANs-Protocol Description and Performance Results version 5.4," 2000, International Journal of Communication Systems, 2000 00: 1-6, pp. 1-25.
Loh et al, Quality of Support and priority Management in HomePNA 2.0 Link Layer, IEEE, 6 pages, 2003.

(56) References Cited

OTHER PUBLICATIONS

Notification of First Office Action, The State Intellectual Property Office of the People's Republic of China, issued in Chinese Application No. 200610107587.1, dated Oct. 11, 2010, 6 pages.

Notification of Reasons for Rejection, Japanese Patent Office, issued in Japanese Patent Application No. 2006-205200, dated Jan. 18, 2011, 3 pages.

Opera Specification—Part 1: Technology, Open PLC European Research Alliance, 198 pages, 1006.

U.S. Appl. No. 11/970,339 Office Action, May 22, 2014, 18 pages.

U.S. Appl. No. 13/873,168 Final Office Action, Jun. 11, 2014, 22 pages.

U.S. Appl. No. 11/970,339 Final Office Action, Jan. 3, 2014, 27 pages.

U.S. Appl. No. 13/873,168 Office Action, Dec. 16, 2013, 23 pages.

U.S. Appl. No. 12/133,301 Final Office Action, Apr. 17, 2014, 28 pages.

"U.S. Appl. No. 13/303,913 Final Office Action", Sep. 16, 2014, 8 pages.

"U.S. Appl. No. 12/133,301 Office Action", Oct. 2, 2014, 34 pages.

"U.S. Appl. No. 13/917,394 Office Action", Oct. 17, 2014, 49 Pages.

"U.S. Appl. No. 11/970,297 Office Action", Jan. 21, 2015, 38 pages.

\* cited by examiner

NETWORK ENCRYPTION KEY ROTATION

RELATED APPLICATIONS

This application is a utility of U.S. Provisional Application Ser. No. 60/941,949, entitled "MANAGING COMMUNICATIONS OVER A SHARED MEDIUM," filed on Jun. 4, 2007, which is hereby incorporated by reference.

TECHNICAL FIELD

The invention relates to managing secure communications over a shared medium.

BACKGROUND

A network of communication stations can share a communication medium (e.g., wires connecting multiple stations or spectrum for transmitting radio signals among stations) using any of a variety of access techniques. A shared communication can be difficult to provide security and controlled access. Even when communications are encrypted using an encryption key, the encryption key associated with the encryption can eventually be compromised through brute force cracking of the encryption key.

SUMMARY

The following are various aspects described herein. In one aspect computer implemented key rotation methods are disclosed. Such method can include: providing a key counter for key rotation at a station; sending a key rotation communication to the station, the key rotation communication comprising a new network encryption key and an adjusted key counter, the key rotation communication being encrypted using a network membership key associated with the station; wherein a station key counter is operable to be compared to the adjusted key counter to determine the authenticity of the key rotation communication.

Systems for key rotation can include a network key generation module and a network key distribution module. The network key generation module can generate a current network key. The network key distribution module can distribute the current network key to a station and can further communicate a current key counter with the current network key. The communication of the current network key and the current key counter can be encrypted using a network membership key, the network membership key being associated with the station. The station can authenticate the current network key based upon the current key rotation based upon a previously received key counter.

Other key rotation systems can include an interface, a decryption module, a local key counter incrementing module and an authentication module. The interface can receive a key rotation communication from a headend device and the decryption module can decrypt the key rotation communication to derive a new key and a headend key counter. The local key counter incrementing module can produce a locally incremented key counter based upon a previous key counter and the authentication module can authenticate the key rotation communication based upon a comparison between the headend key counter derived from the key rotation communication and the locally produced incremented key counter.

Other aspects will be found in the detailed description, drawings and claims.

DETAILED DESCRIPTION

There are a many possible implementations of the invention, some example implementations are described below. However, such examples are descriptions of various implementations, and not descriptions of the invention, which is not limited to the detailed implementations described in this section but is described in broader terms in the claims.

Figure 1:
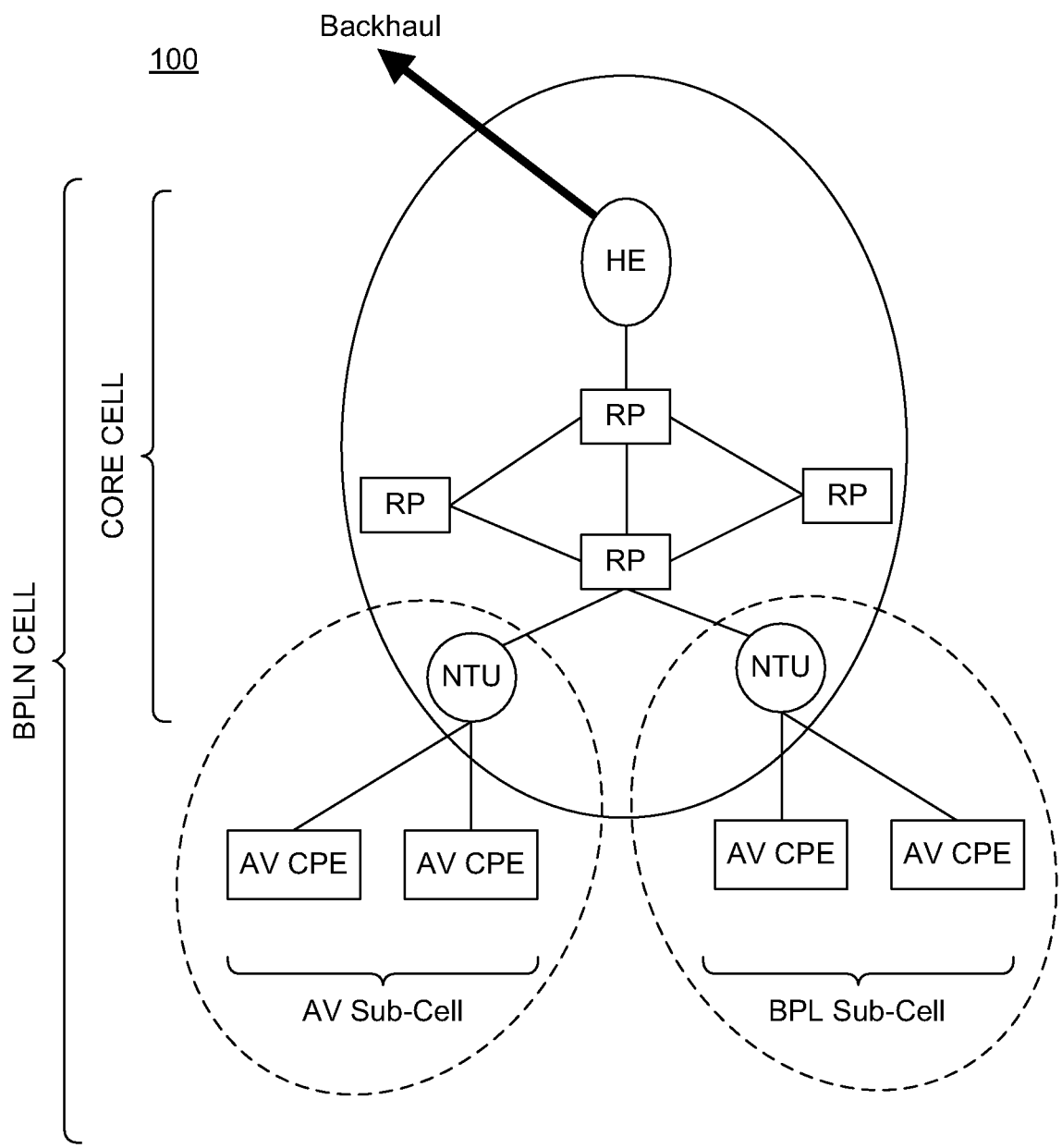
FIG. 1 is a schematic diagram of a communication network.

FIG. 1 shows an exemplary network configuration for an access network 100 such as a broadband power line Network (BPLN) that provides access to a backhaul network. The BPLN can be managed by a service provider entity having access to the underlying physical power line medium. BPLN is a general purpose network that can be used for several types of applications including, smart grid management, broadband internet access, voice and video delivery services, etc. In various implementations, BPLN can be deployed on low voltage, medium voltage and high voltage power lines. Additionally, BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

A BPLN can include one or more cells. A cell is a group of broadband power line (BPL) devices in a BPLN that have similar characteristics such as association management, security, QoS and channel access settings, for example. Cells in a BPLN are logically isolated from each other, and communication to and from the backhaul occurs within the cell. Each cell in a BPLN includes a core-cell and may also include one or more sub-cells. There can be more than one cell on a given physical power line medium.

A core-cell includes a group of devices in a BPLN that includes a head end (HE), repeaters (R), and network termination units (NTU), but can exclude customer premise equipment (CPE). The head end (HE) is a device that bridges a cell to the backhaul network. At a given time, a cell will have one active head end and the head end manages the cell including the core-cell and any associated sub-cells. A repeater (RP) is a device that selectively retransmits media access control (MAC) service data units (MSDUs) to extend the effective range and bandwidth of the BPLN cell. Repeaters can also perform routing and quality of service (QoS) functions. The NTU is a device that connects a BPLN cell to the end users' network or devices. The NTU may in some cases bridge to other network technologies such as WiFi. A single NTU can serve more than one customer. Each Sub-Cell is associated with an active NTU. In some implementations, an HE, an NTU and/or an RP can be co-located at a single station. Thus, a single device may be designed to perform multiple functions. For example, a single device can simultaneously be programmed to perform the tasks associated with an RP and an NTU.

Various types of CPE devices (e.g., a computer) can be used as endpoint nodes in the network and such devices can communicate with other nodes in the network through the NTU.

Each node in the network communicates as a communication "station" (STA) using a PHY layer protocol that is used by the nodes to send transmissions to any other stations that are close enough to successfully receive the transmissions. STAs that cannot directly communicate with each other use one or more repeater STAs to communicate with each other. Any of a variety of communication system architectures can be used to implement the portion of the network interface module that converts data to and from a signal waveform that is transmitted over the communication medium. An application running on a station can provide data to and receives data from the network interface module. A MSDU is a segment of information received by the MAC layer. The MAC layer can process the received MSDUs and prepares them to generate "MAC protocol data units" (MPDUs). A MPDU is a segment of information including header and payload fields that the MAC layer has asked the PHY layer to transport. An MPDU can have any of a variety of formats based on the type of data being transmitted. A "PHY protocol data unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the powerline medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors. A preferred implementation of the MAC and PHY layers used by powerline medium is that based on HomePlug AV specification.

One implementation of the PHY layers is to use OFDM modulation. In OFDM modulation, data are transmitted in the form of OFDM "symbols." Each symbol has a predetermined time duration or symbol time Ts. Each symbol is generated from a superposition of N sinusoidal carrier waveforms that are orthogonal to each other and form the OFDM carriers. Each carrier has a peak frequency fi and a phase $\Phi i$ measured from the beginning of the symbol. For each of these mutually orthogonal carriers, a whole number of periods of the sinusoidal waveform is contained within the symbol time Ts. Equivalently, each carrier frequency is an integral multiple of a frequency interval $\Delta f=1/Ts$. The phases $\Phi i$ and amplitudes Ai of the carrier waveforms can be independently selected (according to an appropriate modulation scheme) without affecting the orthogonality of the resulting modulated waveforms. The carriers occupy a frequency range between frequencies f1 and fN referred to as the OFDM bandwidth.

Figure 2:
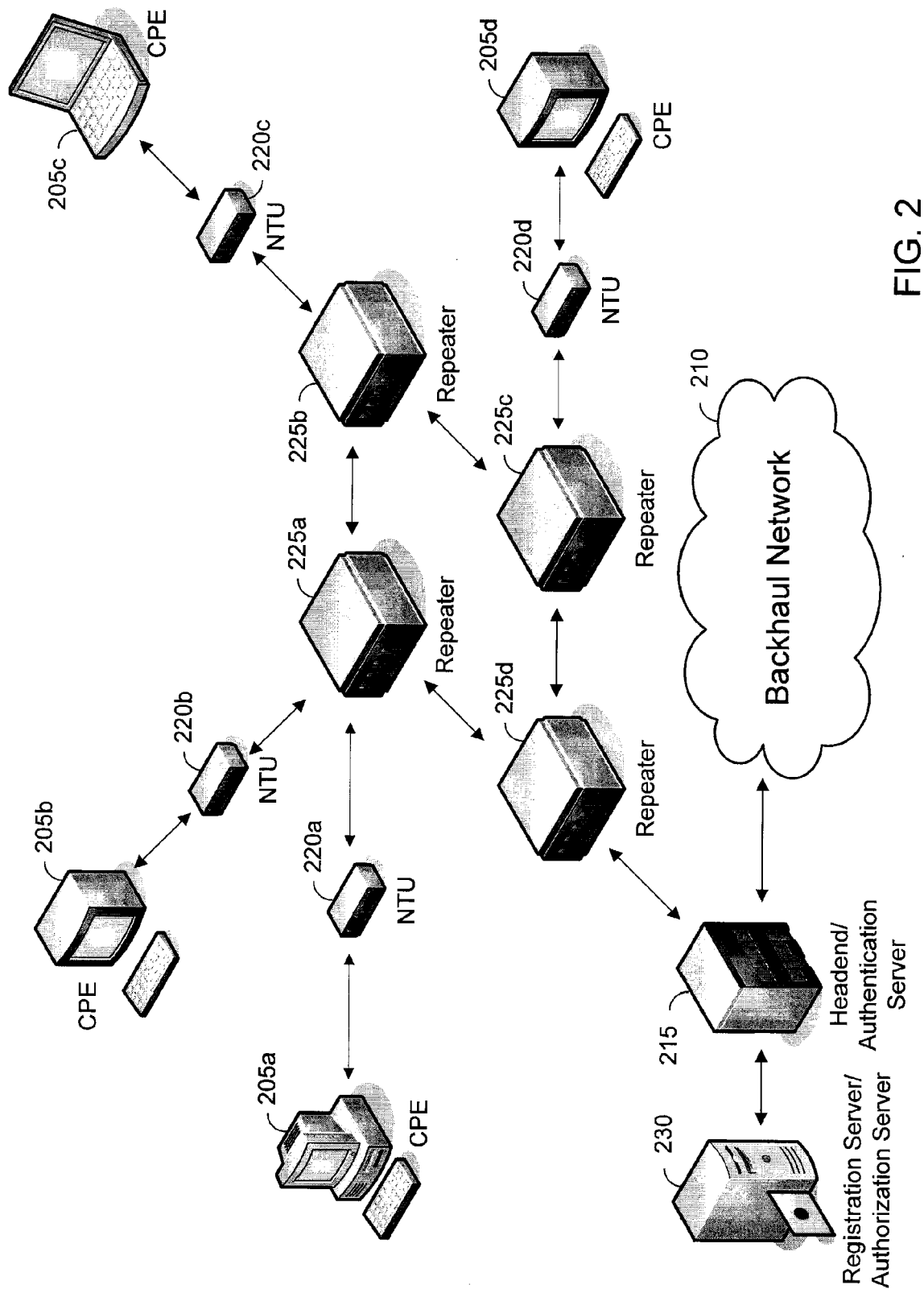
FIG. 2 is a block diagram of a powerline communication network.

FIG. 2 is a block diagram of a powerline communication network. In various implementations, a powerline communication network can enable customer premises equipment (CPE) devices 205a-d to access a backhaul network 210 through a gateway (e.g., a headend/authentication server 215). In various implementations, there can be multiple gateways to the backhaul network 210. For example, it can be inefficient for a CPE device in one city to be required to send a signal to another city prior to accessing the backhaul network 210 (e.g., the Internet).

The CPE devices 205a-d can communicate with the headend 215 through a network of network termination units 220a-d and repeaters 225a-d. In some implementations, the network termination units can operate to translate the data signals from the CPE devices in any of a variety of communications protocols onto a powerline network. For example, a CPE 205a-d might communicate with an NTU 220a-d using a IEEE 802.11 wireless protocol, and the NTU 220a-d can convert the wireless signal to a signal suitable for transmission on a powerline medium. Systems for transmitting and receiving powerline network signals are further described in FIG. 3.

In various implementations, repeaters 225a-d can be located throughout the powerline network to provide the ability for a data signal to travel on the powerline carrier medium over long distances. As discussed above, the headend 215 can provide a gateway for the data signal to be transferred to a backhaul network 210. For example, the headend 215 can extract the data signal from the powerline network and convert the signal for transmission on a packet switched network such as the Internet. In various implementations, one or more of the repeaters 225a-d can be equipped to transfer the signal from the powerline network to the backhaul network 210.

In some implementations, the headend 215 can also include an authorization server. Another implementation includes the authorization server on the backhaul network 210. The authorization server can be operable to authenticate CPE devices 205a-d for transmission of data over the powerline network. When a CPE device 205a-d is not authorized, in various implementations, the CPE device 205a-d can be provided access to a registration server 230. The registration server 230, in various implementations, can enable the user of a CPE device 205a-d to register the CPE device 205a-d with the network to obtain access to the powerline network.

In various implementations, the registration server 230 can provide a limited registration to a CPE device 205a-d to try the powerline network. For example, the registration can be limited by a period of time, bandwidth, destination address, or any other limitation that might allow the user to have limited access to the network. In additional implementations, the registration server 230 can require payment prior to using the network. For example, the registration server can provide web pages operable to collect payment information from the user. In various implementations, the registration server can allow the user to pay for any of a variety of different access plans. For example, an access plan might allow a user to purchase access for a specified period of time, at a specified bandwidth, or combinations thereof. In some implementations the registration server and authorization server can be co-located as shown in FIG. 2. In some implementations, the registration server can be part of the backhaul network 201. In still further implementations, the registration server is not co-located with the authorization server.

Figure 3:
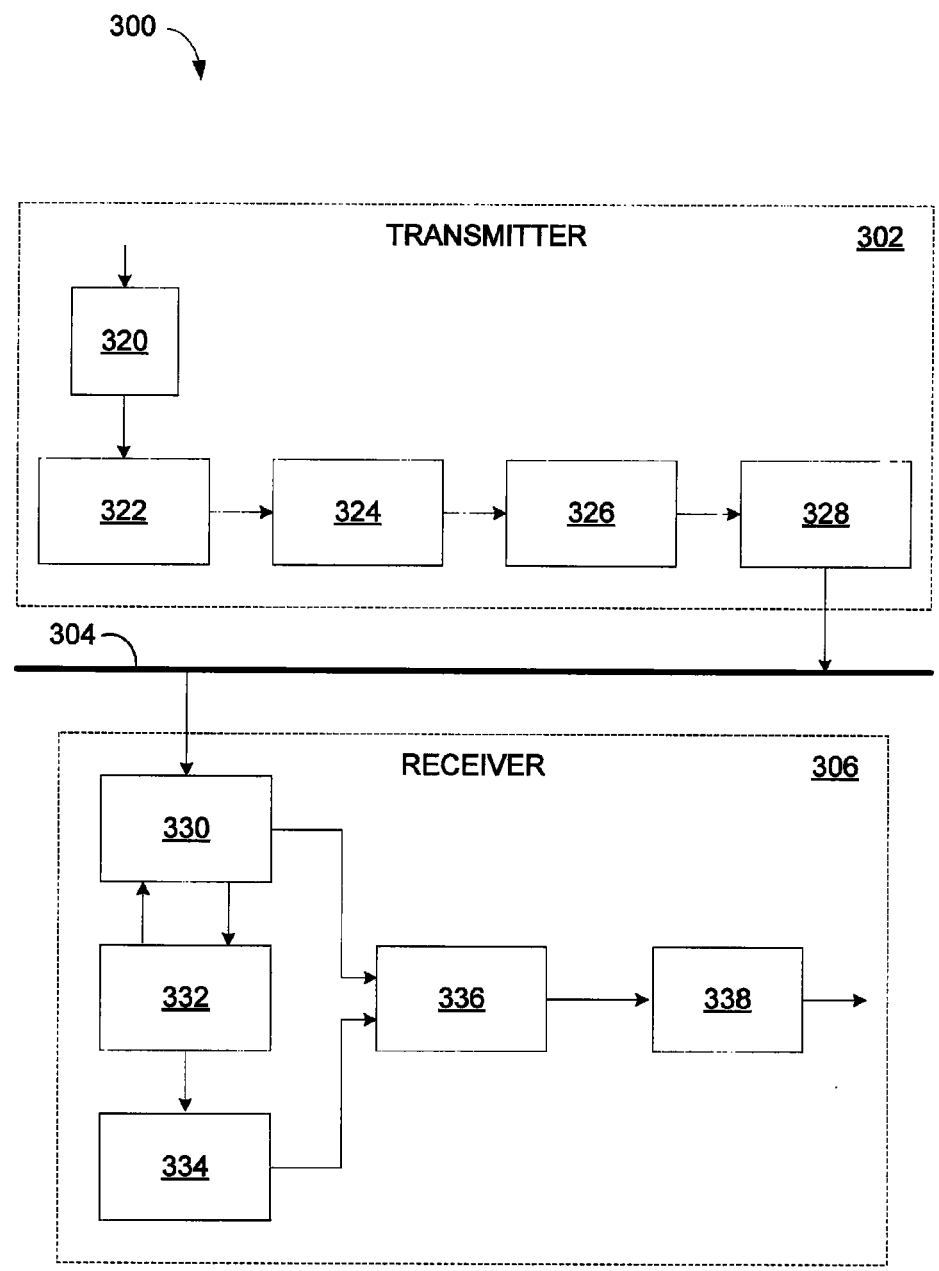
FIG. 3 is a block diagram of a communication system for communicating over a powerline network.

Referring to FIG. 3, a communication system 300 includes a transmitter 302 for transmitting a signal (e.g., a sequence of OFDM symbols) over a communication medium 304 to a receiver 306. The transmitter 302 and receiver 306 can both be incorporated into a network interface module at each station. The communication medium 304 can represent a path from one device to another over the power line network.

At the transmitter 302, modules implementing the PHY layer receive an MPDU from the MAC layer. The MPDU is sent to an encoder module 320 to perform processing such as scrambling, error correction coding and interleaving.

The encoded data is fed into a mapping module 322 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 322 also determines which of the carrier frequencies $f_1, \ldots, f_N$ within the OFDM bandwidth are used by the system 300 to transmit information. For example, some carriers that are experiencing fades can be avoided, and no information is transmitted on those carriers. Instead, the mapping module 322 uses coherent BPSK modulated with a binary value from the Pseudo Noise (PN) sequence for that carrier. For some carriers (e.g., a carrier i=10) that correspond to restricted bands (e.g., an amateur radio band) on a medium 304 that may radiate power no energy is transmitted on those carriers (e.g., $A_{10}=0$). The mapping module 322 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 324 performs the modulation of the resulting set of N complex numbers (some of which may be zero for unused carriers) determined by the mapping module 322 onto N orthogonal carrier waveforms having peak frequencies $f_1, \ldots, f_N$. The modulated carriers are combined by IDFT module 324 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, Ai is the amplitude and $\Phi_i$ is the phase of the carrier with peak frequency $f_i = (i/N)f_R$, and $j=\sqrt{-1}$. In some implementations, the discrete Fourier transform corresponds to a fast Fourier transform (FFT) in which N is a power of 2.

A post-processing module 326 combines a sequence of consecutive (potentially overlapping) symbols into a "symbol set" that can be transmitted as a continuous block over the communication medium 304. The post-processing module 326 prepends a preamble to the symbol set that can be used for automatic gain control (AGC) and symbol timing synchronization. To mitigate intersymbol and intercarrier interference (e.g., due to imperfections in the system 300 and/or the communication medium 304) the post-processing module 326 can extend each symbol with a cyclic prefix that is a copy of the last part of the symbol. The post-processing module 326 can also perform other functions such as applying a pulse shaping window to subsets of symbols within the symbol set (e.g., using a raised cosine window or other type of pulse shaping window) and overlapping the symbol subsets.

An analog front end (AFE) module 328 couples an analog signal containing a continuous-time (e.g., low-pass filtered) version of the symbol set to the communication medium 304. The effect of the transmission of the continuous-time version of the waveform S(t) over the communication medium 304 can be represented by convolution with a function $g(\tau;t)$ representing an impulse response of transmission over the communication medium. The communication medium 304 may add noise n(t), which may be random noise and/or narrowband noise emitted by a jammer.

At the receiver 306, modules implementing the PHY layer receive a signal from the communication medium 304 and generate an MPDU for the MAC layer. An AFE module 330 operates in conjunction with an automatic gain control (AGC) module 332 and a time synchronization module 334 to provide sampled signal data and timing information to a discrete Fourier transform (DFT) module 336.

After removing the cyclic prefix, the receiver 306 feeds the sampled discrete-time symbols into DFT module 336 to extract the sequence of N complex numbers representing the encoded data values (by performing an N-point DFT). Demodulator/Decoder module 338 maps the complex numbers onto the corresponding bit sequences and performs the appropriate decoding of the bits (including de-interleaving and descrambling).

Any of the modules of the communication system 300 including modules in the transmitter 302 or receiver 306 can be implemented in hardware, software, or a combination of hardware and software.

Figure 4:
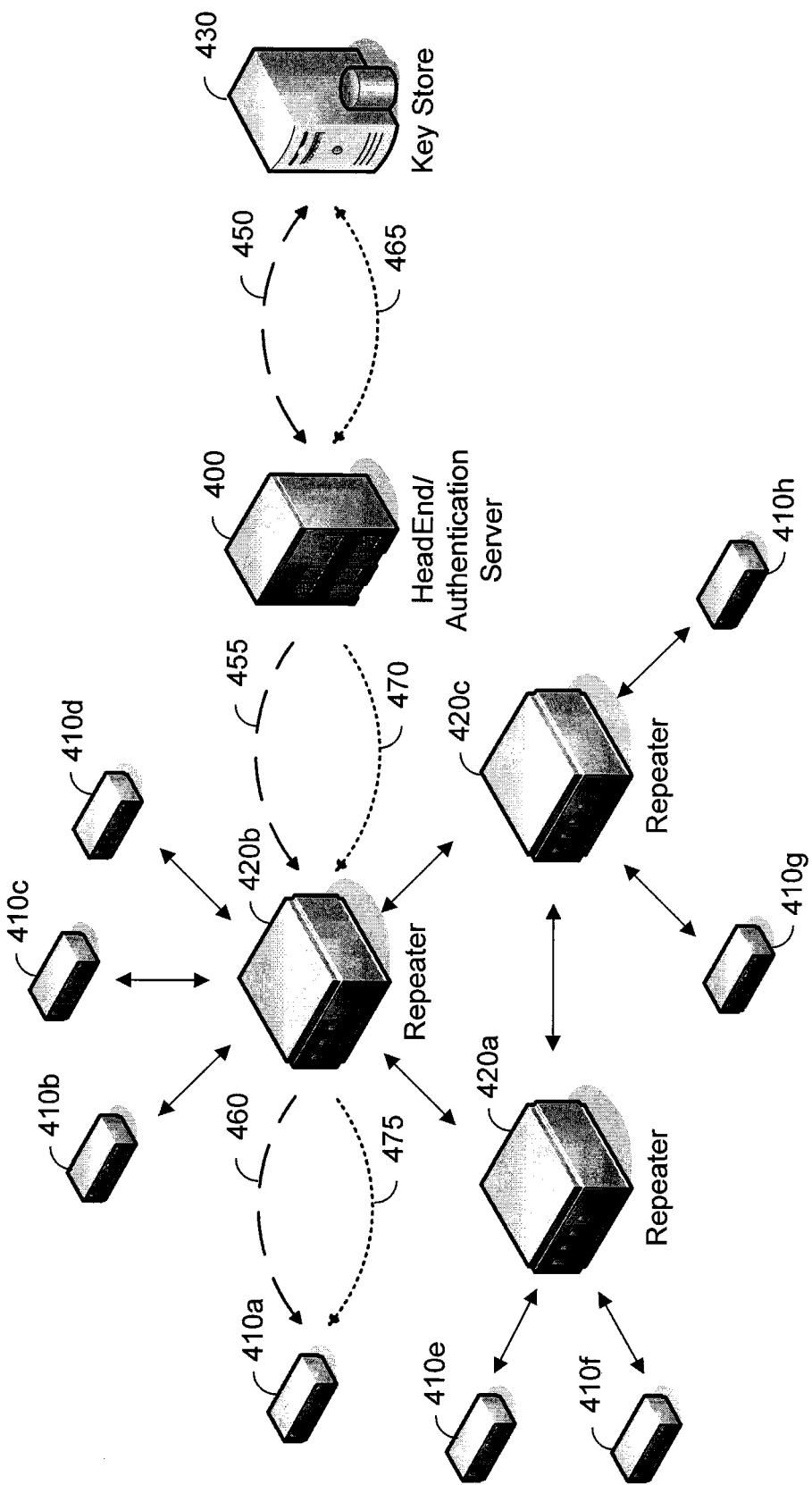
FIGS. 4 and 5 are block diagrams illustrating a process for rotating network encryption keys in a network.

FIG. 4 is a block diagram illustrating a process for rotating network encryption keys in a network. The powerline network, in various implementations, can include a headend 400, number network termination units (NTUs) 410a-h and repeaters 420a-c. The NTUs 410a-h can communicate with a headend 400 through the repeaters 420a-c. The repeaters 420a-c can help to restore losses in the signals over spans in the network prior to the signal reaching a headend 400. The headend 400 can provide a gateway to a backhaul network.

In various implementations, the stations (e.g., repeaters 420a-c and NTUs 410a-h) are provided with a network encryption key (NEK). The NEK can be used to facilitate communications among the stations and provide protection from unauthorized devices joining the network. However, as with any key, the NEK can be cracked if it is used for an extended period of time. In various implementations, the NEK can be rotated periodically to make it more difficult to crack the NEK. In some implementations, the rotated key can be transmitted to the stations (e.g., NTUs 410a-h, repeaters 420a-c, etc.) by a headend 400.

However, it can be difficult to determine whether a new NEK (e.g., rotated NEK) is authentic. For example, a device attempting to compromise the network could send a communication indicating that the network is using a new NEK and compromise one or more network devices. In some implementations, the headend 400 can transmit a key rotation counter to each of the devices in a network (e.g., NTUs 410a-h, repeaters 420a-c, etc.). For example, the transmitted key counter can be an initial n-digit number sent with the NEK during an initial connection to the network. In some implementations, the n-digit number can be identical across all of the devices in the network. In other implementations, each device can be provided with a counter that is specific to the particular device. For example, NTU 410a might receive a key counter of 53045, while NTU 410*b* might receive a key counter of 20783. When the headend 400 sends a new NEK, the headend 400 can use the particular key counter associated with the specific device to which the NEK is being transmitted to provide authentication for the new NEK.

In some implementations, the key rotation counter can be incremented by a function each time a new NEK is transmitted. In those implementations where the key rotation counter is specific to each of the various devices on the network, a particular key counter associated with a particular device can be incremented by a function each time a new NEK is sent to the particular device. In various implementations, any incrementing function can be used. For example, the counter could be incremented by a period (e.g., by summing with a number), by multiplying by a number, or by any other function.

In some implementations, the function associated with the increment can be transmitted when the initial counter is sent. In other implementations, the function associated with the increment can be transmitted when the new NEK is sent. In still further implementations, network stations (e.g., NTUs 410*a-h*, repeaters 420*a-c*, etc.) can have prior knowledge of the function based upon initial setup before deployment. Thus, the station receiving the new NEK with the incremented counter can increment its own counter (e.g., previously received from the headend 400 when the initial NEK was received) using a known function and determine that the key rotation request is authentic.

In the various implementations described above, any or all of the communications between the headend and the stations (e.g., NTUs 410*a-h*, repeaters 420*a-c*, etc.) can be encrypted using a network membership key (NMK) associated with the respective station. The NMK associated with the respective device can be retrieved, for example, from a key store 430.

In the example of FIG. 4, a headend 400 can respond to a connection request from the NTU 410*a*, by retrieving an NMK associated with the NTU 410*a* from a key store 430, as shown by signal 450. The headend 400 can encrypt a current NEK using the NMK associated with the NTU 410*a*. The headend 400, in some implementations, can also encrypt a current key rotation counter for inclusion in the response to the connection request received from the NTU 410*a*. At signal 455 and signal 460, the headend 400 transmits the encrypted NEK and the key rotation counter to the NTU 410*a*. The NTU 410*a* can thereafter decrypt the NEK and the key rotation counter using its NMK. The NTU 410*a* can use the NEK to encrypt communications on the network.

After expiration of a rotation period associated with the current NEK, the headend device 400 can determine to rotate the NEK. To do so, the headend 400 can retrieve an NMK associated with the NTU 410*a* from the key store 430, as shown by signal 465. The headend 400 can also rotate the key rotation counter using a function and generate a new NEK. The headend 400 can then use the NMK to encrypt the new NEK and the incremented key rotation counter. The encrypted new NEK and incremented key rotation counter can be transmitted to the NTU 410*a*, as shown by signal 470 and signal 475. The NTU 410*a* can decrypt the key rotation communication using its NMK. The NTU 410*a* can locally increment the previously received key rotation counter. If the decrypted key rotation counter matches the locally incremented key rotation counter, the new NEK is determined to be authentic and the previous NEK is discarded in favor of the new NEK. If the decrypted key rotation counter does not match the locally incremented key rotation counter, the new NEK is disregarded and the previous NEK continues to be used.

Figure 5:
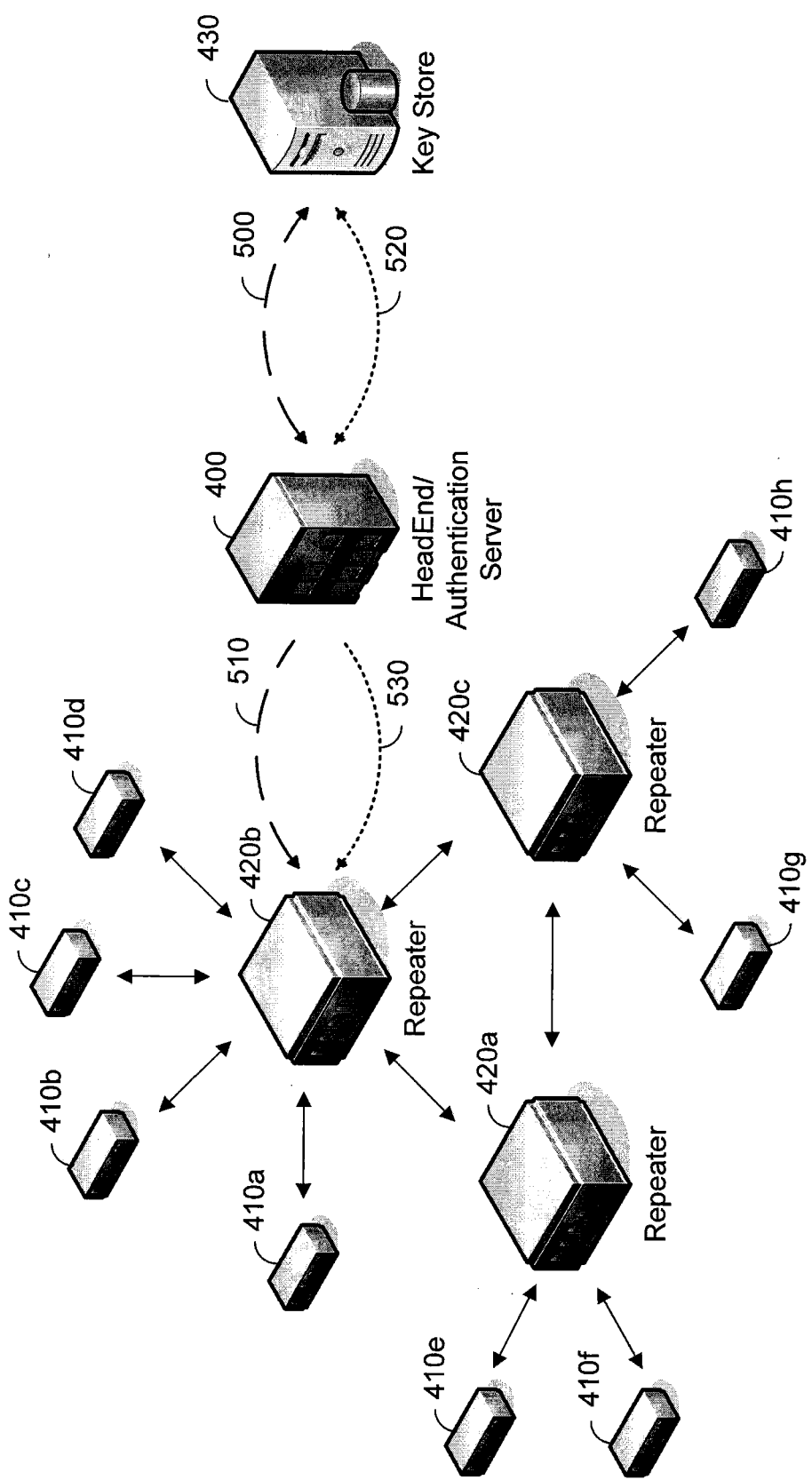

FIG. 5 is a block diagram illustrating a process for rotating network encryption keys in a network. The standard operation of the network of FIG. 5 is substantially similar to the operation of the network shown in FIG. 4. In the example of FIG. 5, a headend 400 can respond to a connection request from the repeater 420*b*, by retrieving an NMK associated with the repeater 420*b* from a key store 430, as shown by signal 500. The headend 400 can encrypt a current NEK using the NMK associated with the repeater 420*b*. The headend 400, in some implementations, can also encrypt a current key rotation counter for inclusion in the response to the connection request received from the repeater 420*b*. At signal 510, the headend 400 transmits the encrypted NEK and the key rotation counter to the repeater 420*b*. The repeater 420*b* can thereafter decrypt the NEK and the key rotation counter using its NMK. The repeater 420*b* can use the NEK to encrypt communications on the network.

After expiration of a rotation period associated with the current NEK, the headend device 400 can determine to rotate the NEK. To do so, the headend 400 can retrieve an NMK associated with the repeater 420*b* from the key store 430, as shown by signal 520. The headend 400 can also rotate the key rotation counter using a function and generate a new NEK. The headend 400 can then use the NMK associated with the repeater 420*b* to encrypt the new NEK and the incremented key rotation counter. The encrypted new NEK and incremented key rotation counter can be transmitted to the repeater 420*b*, as shown by signal 530. The repeater 420*b* can decrypt the key rotation communication using its NMK. The repeater 420*b* can locally increment the previously received key rotation counter. If the decrypted key rotation counter matches the locally incremented key rotation counter, the new NEK is determined to be authentic and the previous NEK is discarded in favor of the new NEK. If the decrypted key rotation counter does not match the locally incremented key rotation counter, the new NEK is disregarded and the previous NEK continues to be used.

Figure 6:
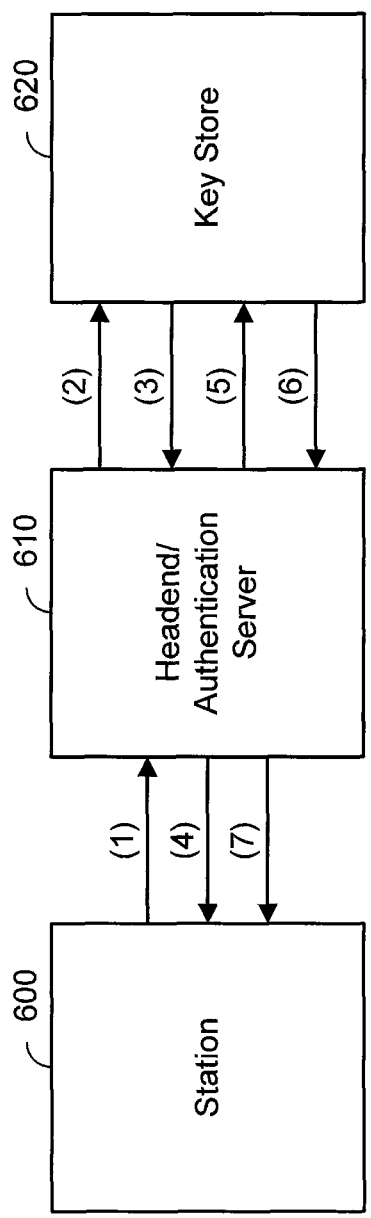
FIG. 6 is a block diagram illustrating the communication flow associated with rotating keys in a network.

FIG. 6 is a block diagram illustrating the communication flow associated with rotating keys in a network. When a station 600 (e.g., an NTU, repeater, headend, etc.) joins the network, the new station 600 can transmit a network encryption key (NEK) request as shown by signal (1). In various implementations, the NEK can be used to encrypt communications among powerline network devices (e.g., NTUs, repeaters, headend(s), MAC/DAK data store, etc.). The NEK request can be encrypted using the NMK associated with the new station 600.

Upon receiving a request for the NEK, a headend/authentication server 610 can authenticate the request by retrieving the NMK associated with the requesting station 600 from a key store 620, as shown by signals (2) and (3), and attempting to decrypt the NEK request using the NMK associated with the requesting station 600. If the NMK associated with the requesting station 600 is operable to decrypt the NEK request, the headend/authentication server 610 can identify a current key rotation counter and encrypt the NEK and the current key rotation counter using the NMK associated with the requesting station 600 and communicate the encrypted NEK and current key rotation counter to the requesting station 600 as shown by signal (4). The new station 600 can receive the encrypted NEK and current key rotation counter, and use its NMK to decrypt the NEK and current key rotation counter. Upon decrypting the NEK, the new station 600 can encrypt communications to other network devices using the NEK.

After the expiration of the NEK, the headend/authentication server 610 can retrieve the NMK associated with the station 600 from a key store 620 as shown by signals (5) and (6). The headend/authentication server 610 can also increment the current key rotation counter and generate a new NEK. The headend/authentication server 610 can encrypt the incremented key rotation counter and the new NEK using the NMK associated with the station 600, thereby generating a key rotation communication.

The key rotation communication can be transmitted to the station 600 as shown at signal (7). The key rotation communication can be decrypted by the station using the NMK associated with the station. The station can locally increment the current key rotation counter and compare the locally incremented counter with the key rotation counter received in the key rotation communication. If the locally incremented counter matches the counter value received in the key rotation communication, the key rotation communication is authenticated, and the station can begin using the new NEK and can discard the previous NEK. If the locally incremented counter does not match the counter value received in the key rotation communication, the key rotation communication can be disregarded.

Figure 7:
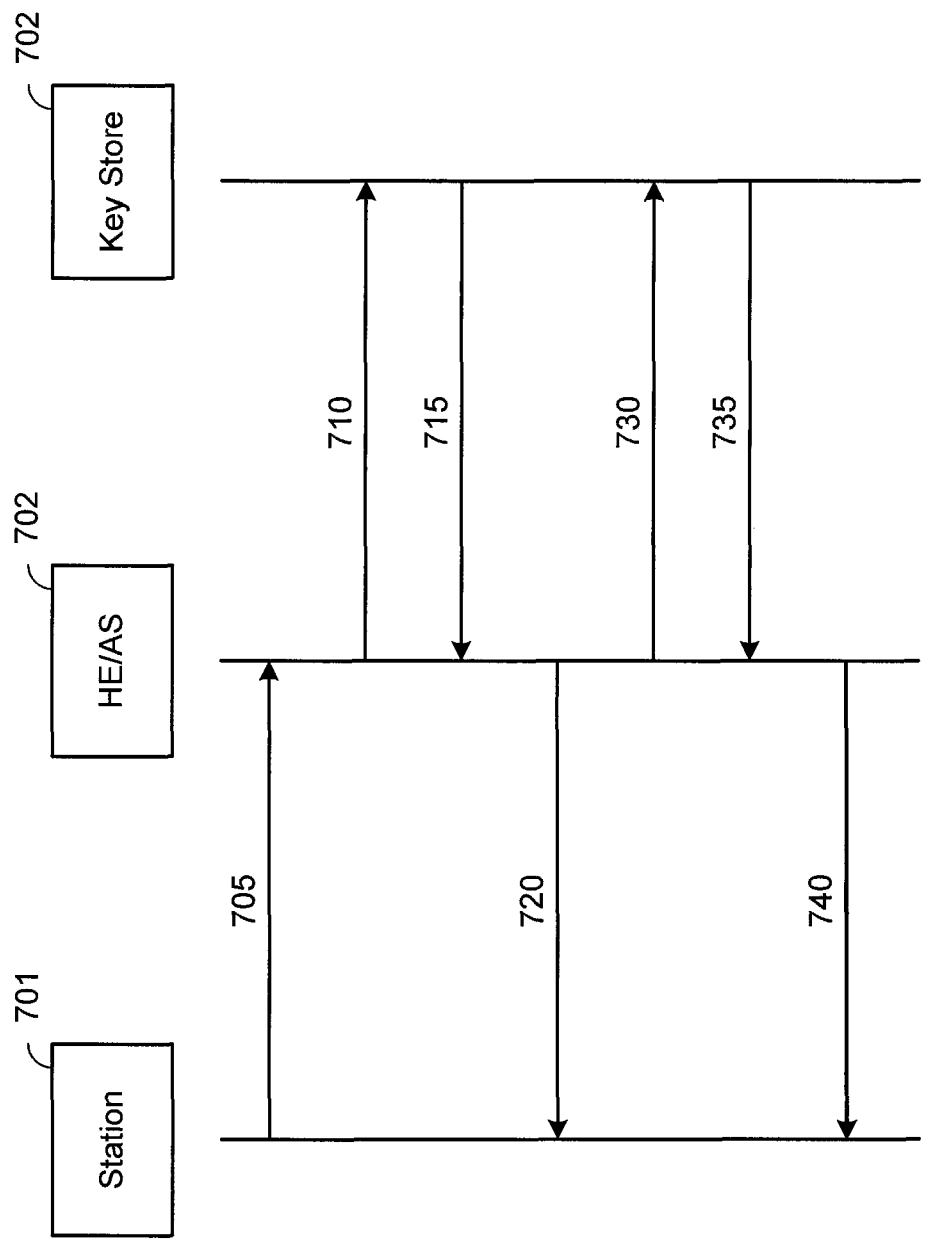
FIG. 7 is a flow diagram depicting an example flow for rotation of network keys.

FIG. 7 is a flow diagram depicting an example flow for rotation of keys. In some implementations, the station can use the unique NMK to encrypt a request a network encryption key (NEK) as shown by signal 705. In such implementations, the NEK can be used to encrypt all communications among stations 701 in a core cell (e.g., core cell of FIG. 1). The HE or AS 702 can authenticate the request by decrypting the request by querying a key store 703 for the NMK associated with the requesting station 701 as shown by signal 710. The NMK received from the key store 703, as shown by signal 715, can be used to decrypt the NEK request. If the NMK can decrypt the NEK request, the NEK request is determined to be authentic. The HE or AS 702 can provide the NEK and a key rotation counter based upon authenticating the request as shown by signal 720. In various implementations, the NEK and key rotation counter can be encrypted using the NMK associated with the station 701.

The NEK can thereafter be rotated to protect the network encryption key from cracking using brute force algorithms. In order to protect stations from illegitimate key rotations requests, an authentication server can provide a counter to the stations. In some implementations, the same counter can be provided to all stations. In other implementations, the counter can be a pseudo-random number that may differ between stations. In some implementations, the counter can be provided in an encrypted format, for example, using a network membership key (NMK) associated with the station, or using a device access key associated with the station. In other implementations, the counter can be provided to the station with the first NEK, both the counter and the NEK being encrypted using the NMK associated with that device.

The counter can serve to test that a new NEK is authentic. In some implementations, a rotation message can be sent to the stations. To do so, the HE or AS 702 can query the key store 703 as for the NMK associated with the station 701 as shown by signal 730. The NMK associated with the station is then received by the HE or AS 702, as shown by signal 735. A rotation message can be generated. The rotation message can include the new NEK and an incremented counter. In various implementations, the increment associated with the counter might not be linear, or might not be incremental, but rather the counter may be incremented according to some function known to both the authentication server and the stations. The rotation message can be encrypted using the retrieved NMK associated with the respective station 701 and then transmitted to the station 701 as shown by signal 740.

Upon receiving a rotation message, the station 701 can decrypt the message using the station's NMK. The station 701 can compare the counter value included in the rotation message to its own counter value. If the counter values match, the new NEK is authenticated, and replaces the previous NEK.

Figure 8:
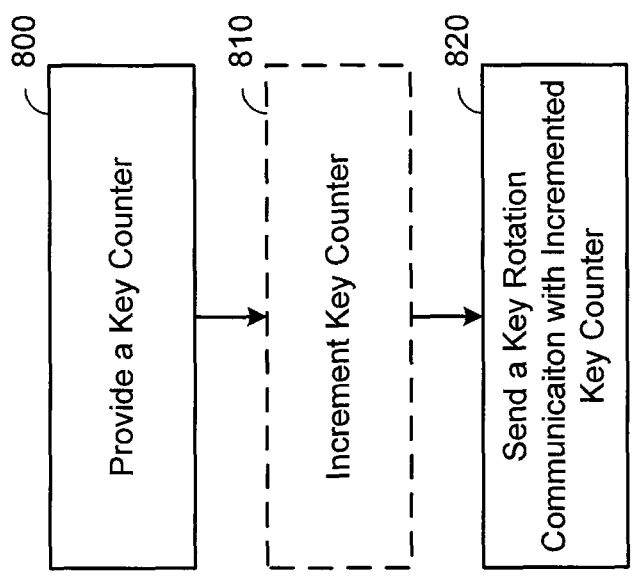

FIG. 8 is a flowchart illustrating an example method to rotate network keys. At stage 800, a key counter is provided. The key counter can be provided, for example, by a headend device (e.g., headend 400 of FIG. 4). In various implementations, the key counter can be randomly generated. In some implementations, a different key counter can be generated for each station on the network. In other implementations, the same key counter can be used for every station on the network.

At optional stage 810, the key counter can be incremented. The key counter can be incremented, for example, by a headend device (e.g., headend 400 of FIG. 4). In various implementations, the key counter can be incremented by a function. The function, for example, can be linear or non-linear. Moreover, the function, in some implementations can be specific to the particular key counter being incremented. Thus, each station can be incremented by a different function, thereby inhibiting hackers from being able to compromise multiple stations.

At stage 820, a key rotation communication can be transmitted. The key rotation communication can be transmitted, for example, by a headend device (e.g., headend 400 of FIG. 4). The key rotation communication, in various implementations, can be encrypted and can include a new NEK and an incremented key counter value. The incremented key counter value can be used by the station to determine the authenticity of the key rotation communication. For example, if the incremented key counter value does not match a locally incremented value, the key rotation communication is considered invalid.

Figure 9:
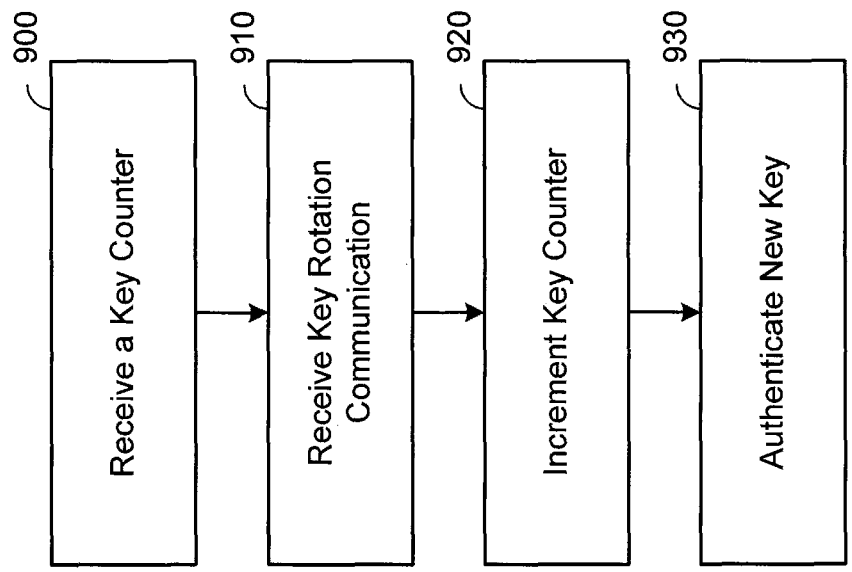
FIGS. 8 and 9 are flowcharts illustrating example methods for rotating keys to provide authentication of key rotation communications.

FIG. 9 is a flowchart illustrating an example method to authenticate a key rotation communication. At stage 900, a key counter is received. The key counter can be received, for example, by a station (e.g., NTU 410 or repeater 420 of FIG. 4). In various implementations, the key counter can be stored by the station until a key rotation communication is received.

At stage 910, a key rotation communication is received. The key rotation communication can be received, for example, by a station (e.g., NTU 410 or repeater 420 of FIG. 4). In various implementations, the key rotation communication can be encrypted using an NMK associated with the station. The key rotation communication can be decrypted based upon the station's knowledge of its own NMK. The key rotation communication can include, for example, a new NEK and an incremented key counter.

At stage 920, a local key counter can be incremented. The local key counter can be incremented, for example, by a station (e.g., NTU 410 or repeater 420 of FIG. 4). In various implementations, the incrementing can be done by a previously identified function known to both the station and to an authentic originator of key rotation communications. In additional implementations, the function used to increment the key counter can be any function (linear or non-linear) known to both the station and the originator of authentic key rotation communications. In various implementations, the incrementing can be performed at any time before authentication of the new NEK.

At stage 930, the new key can be authenticated. The new key can be authenticated, for example, by a station (e.g., NTU 410 or repeater 420 of FIG. 4). In various implementations, the new key can be authenticated by comparing a locally incremented key counter with a key counter received as part of a key rotation communication. For example, when the local counter and received counter match, the new key is authentic. When the local counter and received counter do not match, the new key is not authentic.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

These and other implementations are within the scope of the following claims.

What is claimed is:

1. A method for key rotation by a headend device, the method comprising:
providing an initial counter value to a station;
incrementing the initial counter value at the headend device based on a non-linear function to produce a headend incremented counter value; and
sending a key rotation communication from the headend device to the station, the key rotation communication comprising a new network encryption key and the headend incremented counter value, the key rotation communication to replace a previous network encryption key with the new network encryption key,
wherein the headend incremented counter value authenticates the key rotation communication based, at least in part, on the headend incremented counter value matching a station incremented counter value that is derived from the initial counter value and the non-linear function.

2. The method of claim 1, wherein the non-linear function is known to an authentication server included in the headend device and to a plurality of authorized stations including the station.

3. The method of claim 1, further comprising providing the non-linear function to the station utilizing a secure mechanism.

4. The method of claim 1, wherein distinct non-linear functions are provided to a plurality of stations including the station.

5. The method of claim 1, further comprising providing the previous network encryption key to the station prior to sending the key rotation communication.

6. The method of claim 5, wherein the initial counter value is provided at a same time as the previous network encryption key.

7. The method of claim 1, wherein the headend device and the station are part of a powerline network.

8. The method of claim 1, wherein the headend device includes an authentication server, the headend device connects the station to a backhaul network.

9. The method of claim 1, wherein the key rotation communication is encrypted using a network membership key associated with the station, and wherein the network membership key is retrieved by the headend device from a key store.

10. A method for key rotation performed by a station, the method comprising:
receiving, at the station, an initial counter value from a headend device;
receiving, at the station, a key rotation communication comprising a new network key and a headend incremented counter value, wherein the headend incremented counter value is based on the initial counter value and a non-linear function at the headend device;
locally incrementing, at the station, the initial counter value based on the non-linear function to produce a station incremented counter value; and
authenticating the key rotation communication based, at least in part, on comparing the headend incremented counter value and the station incremented counter value.

11. The method of claim 10, wherein receiving the initial counter value comprises receiving the initial counter value with a previous network key.

12. The method of claim 11, further comprising replacing the previous network key with the new network key in response to authenticating the key rotation communication.

13. The method of claim 12, wherein the key rotation communication is decrypted by the station using a network membership key associated with the station.

14. The method of claim 13, wherein the network membership key is retrieved by the station from a key store.

15. The method of claim 10, wherein the non-linear function is known to an authentication server included in the headend device and to a plurality of authorized stations including the station.

16. The method of claim 10, wherein the initial counter value is received from an authentication server that connects the station to a backhaul network.

17. A headend system comprising:
a processor; and
memory storing instructions therein which, when executed by the processor, cause the headend system to:
generate a new network key;
provide an initial counter value to a station;
increment a previous counter value based on a non-linear function to produce a headend incremented counter value; and
transmit a key rotation communication including the new network key and the headend incremented counter value to the station,
wherein the headend incremented counter value authenticates the key rotation communication based, at least in part, on the headend incremented counter value matching a station incremented counter value that is derived from the initial counter value and the non-linear function.

18. The headend system of claim 17, wherein the instructions, when executed by the processor, cause the headend system to store, in memory, the new network key associated with the station and the headend incremented counter value associated with the station.

19. A headend system of claim 17, wherein the headend system and the station are part of a powerline network.

20. A station, comprising:
an interface to receive a key rotation communication from a headend device;
a processor; and
memory storing instructions therein which, when executed by the processor, cause the station to:
decrypt the key rotation communication to derive a new network key and a headend incremented counter value, wherein the headend incremented counter value has been incremented by the headend device based, at least in part, on a previous counter value and a non-linear function;
independently increment the previous counter value based on the non-linear function to produce a station incremented counter value; and
authenticate the key rotation communication based, at least in part, on a comparison between the headend incremented counter value and the station incremented counter value.

* * * * *